United States Patent [19]

Kim

[11] Patent Number: 5,270,884
[45] Date of Patent: Dec. 14, 1993

[54] SERVO CONTROL METHOD IN THE ABSENCE OF TAPE CONTROL SIGNALS

[75] Inventor: Chul H. Kim, Kyounggi, Rep. of Korea

[73] Assignee: SamSung Electronics Co. Ltd., Kyungki, Rep. of Korea

[21] Appl. No.: 708,386

[22] Filed: May 31, 1991

[30] Foreign Application Priority Data

Jun. 4, 1990 [KR] Rep. of Korea .............. 90-8331

[51] Int. Cl.[5] .................. G11B 15/52; G11B 15/18
[52] U.S. Cl. .................. 360/73.12; 360/72.3
[58] Field of Search ........ 360/73.01, 73.02, 73.05, 360/73.09, 73.11, 73.12, 73.14, 73.13, 72.3, 78.14

[56] References Cited

U.S. PATENT DOCUMENTS

| | | | |
|---|---|---|---|
| 4,104,684 | 8/1978 | Wakami et al. | 360/73.09 |
| 4,338,640 | 7/1982 | Yabu et al. | 360/73.06 |
| 4,409,628 | 10/1983 | Frimet et al. | 360/73.09 |
| 4,532,561 | 7/1985 | Kimura et al. | 360/73.01 |
| 4,613,914 | 9/1986 | Kobori et al. | 360/70 |

FOREIGN PATENT DOCUMENTS 0318981 10/1971 U.S.S.R. .............. 360/73.14

Primary Examiner—John Zazworsky
Attorney, Agent, or Firm—Robert E. Bushnell

[57] ABSTRACT

A servo control method in the absence control signals is comprised of a compare routine (L1) and a non-signal phase control routine (L2). The compare routine (L1) is carried out in such a manner that an envelope value detected by controlling a capstan motor is compared with a predetermined value, when the control pulse is not detected. The non-signal phase control routine (L2) is carried out in such a manner that the phase of the capstan motor is adjusted until a desirable state of video signals arrives by making a dummy phase error section generate a dummy phase error signal when the detected envelope value is smaller than the predetermined value. According to the present invention, a normal picture can be maintained even when no control signals are detected from the tape.

12 Claims, 3 Drawing Sheets

SERVO CONTROL METHOD IN THE ABSENCE OF TAPE CONTROL SIGNALS

FIELD OF THE INVENTION

The present invention relates to an electronic apparatus using a tape in which a servo for controlling a phase of tape speed is provided to assure accurate decoding of signals recorded on the tape, and more particularly relates to such a servo control method in the absence of tape control signals in which proper pictures can be maintained even when control pulses are not recorded on the tape or can not be read.

BACKGROUND OF THE INVENTION

Generally, when video signals are recorded on a tape, control pulses are also recorded on a side of the tape to assure that the speed and phase during regeneration are the same as that of the recording process.

However, due to various reasons such as degradation of the tape, the control pulses on the tape become suppressed or unreadable, so frequently the speed and phase of the regeneration is different from those of the recording process due to the absence of the control pulses, thereby making it impossible to maintain a proper picture state. That is, if a tape in which no control pulse is detected is to be regenerated, noises occur on the pictures due to a hunting phenomenon, thereby degrading the picture.

SUMMARY OF THE INVENTION

The present invention is intended to overcome the above described disadvantage.

It is therefore an object of the invention to provide a servo control method in the absence of control signals, in which the servo is controlled in response to a dummy capstan phase error signal by performing capstan step control until the normal video signal state arrives to stop the controls at a proper position, so as to assure a proper picture state even when no control signal is detected.

In order to attain the above object, the servo control method in the absence of control signals, according to the present invention, controls the speed and phase of the capstan motor by detecting the tape control pulses, and the method according to the present invention comprises: the step of carrying out a compare routine for comparing a detected envelope value with a predetermined value by controlling the speed of the capstan motor in the case of non-detection of control pulses, and the step of carrying out a non-signal phase control routine in accordance with the phase of the capstan motor until a desirable state of the video signals occurs, by making a dummy phase error section generate a dummy phase error signal in the case where the envelope value is found to be smaller than the predetermined value as a result of carrying out the compare routine.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
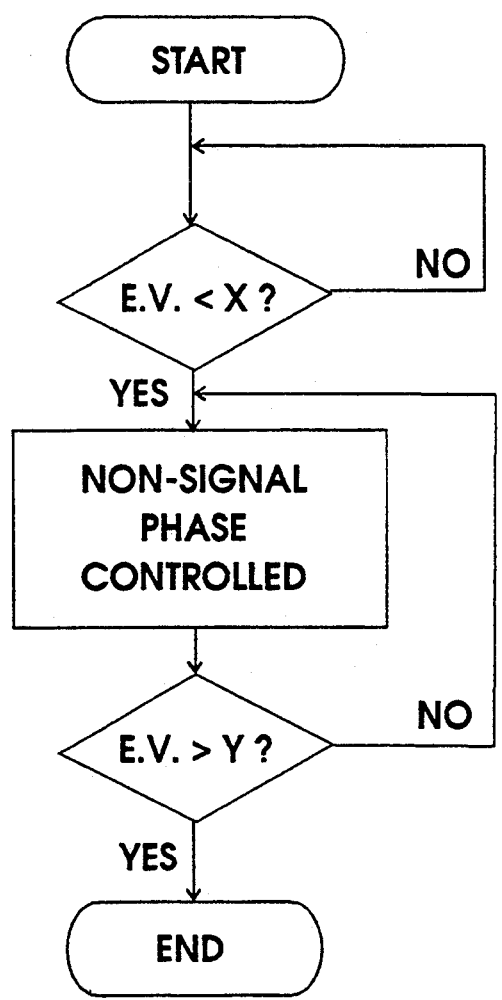
FIG. 1 is a flow chart showing the servo control method according to the present invention.

FIG. 1 is a flow chart showing the basic constitution of the servo control method in the absence of control signals according to the present invention. If an envelope value (to be called hereinafter "E.V.") of the video signal, which is detected from the starting point in the absence of the tape control pulse, is found to be smaller than a predetermined value X, a non-signal phase control routine L2 in FIG. 2 is carried out, while, if the E.V. of video signals is larger than a predetermined value Y, a normal regenerating operation is carried out after satisfying an exit condition from the non-signal phase control routine.

Here, the predetermined values X, Y are obtained through experiments. That is, when there is no control signal on the tape, if the E.V. is smaller than the predetermined value X, then the non-signal phase control routine is carried out, so that the servo should be controlled by a dummy capstan phase error signal. If the E.V. is found to be larger than the predetermined value Y during the implementation of the non-signal phase control routine L2, then an exit from the non-signal phase control routine L2 is carried out to resume the normal operation.

Figure 2:
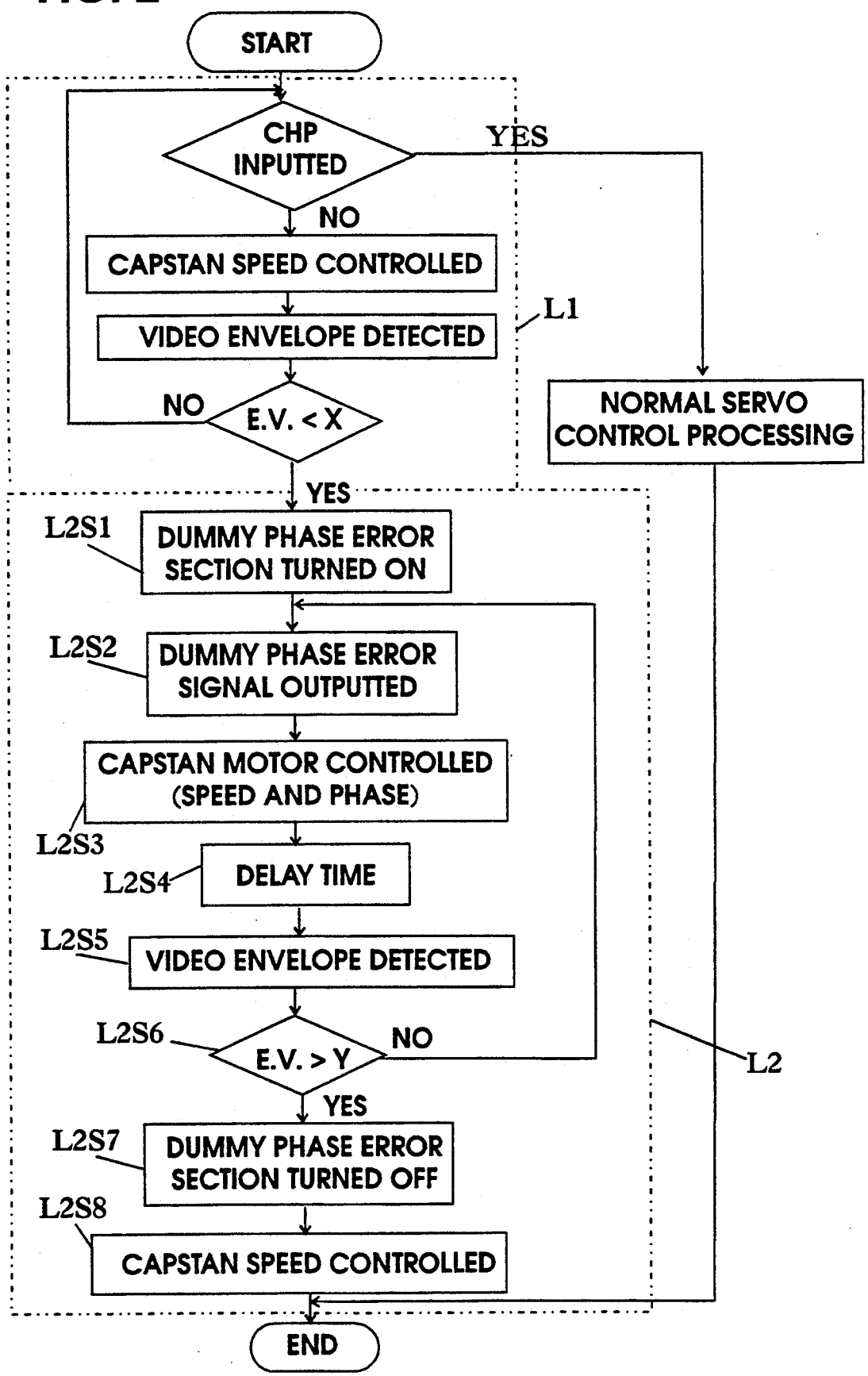
FIG. 2 is a flow chart showing the method of the present invention in more detail.

FIG. 2 is a flow chart showing the detailed constitution of the servo control method in the absence of tape control signals according to the present invention. If the control pulses are not detected, the speed of capstan motor M is controlled, and then, a compare routine L1 is carried out by comparing the detected E.V. with the predetermined value X. If the E.V. is found to be smaller than the predetermined value X as the result of carrying out the compare routine L1, then the dummy phase error section 4 outputs a dummy phase error signal, and the non-signal phase control routine L2 is carried out by properly adjusting the phase of capstan motor M until an acceptable state is brought about in the video signals.

Figure 3:
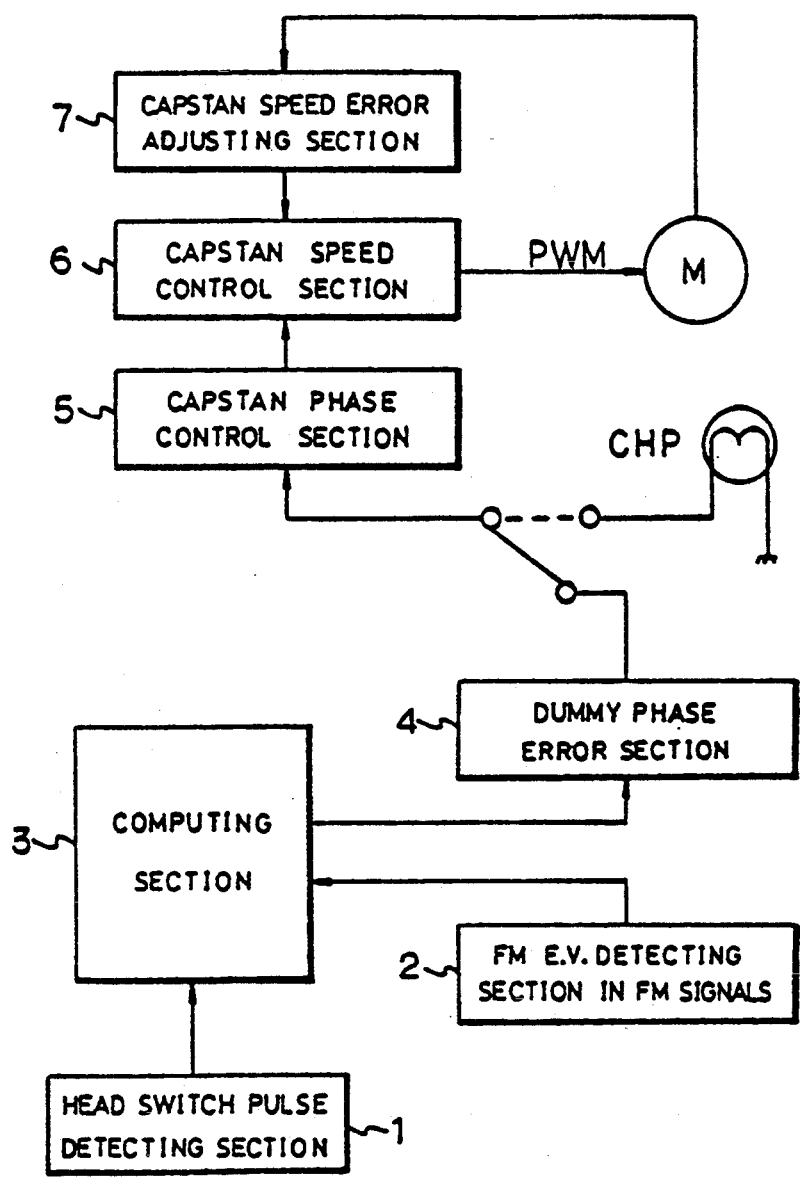
FIG. 3 is a schematic block diagram for accomplishing the control method of the present invention.

In the non-signal phase control routine L2, steps L2S1 and, L2S2 are carried out by making the dummy phase error section 4 of FIG. 3 output a dummy phase error signal, and then, a step L2S3 is carried out by controlling the phase of the capstan motor M by means of the dummy phase error signal generated at the step L2S2.

Then, there is carried out a step L2S4 of providing a delay time as much as required for adjusting the phase of the capstan motor M according to the dummy phase error signal, and then, a step L2S5 is carried out by detecting the E.V. of the video signals.

Then, a step L2S6 is carried out by comparing the E.V. of the step L2S5 with the predetermined value Y, and, if it is found at the step L2S6 that the detected E.V. is larger than the predetermined value Y, then, a step L2S7 is carried out by blocking the outputting of the dummy phase error signal.

Then a step L2S8 is carried out by controlling the capstan motor M by means of the capstan motor speed control signal.

In the present invention as described above, if capstan phase controlling pulses (to be called hereinafter "CHP") recorded on the tape are detected in the normal pattern, the speed and phase of the regenerating tape are adjusted to the same speed and phase as those of the recording process by the CHP which are detected during the normal servo control routine, thereby enabling normal video signal reproduction.

That is, if the CHP signals are detected from the tape, a capstan phase control section 5 controls the capstan phase, and a capstan speed control section 6 controls the speed, so that the phase and speed of the capstan motor M should be controlled by the CHP signals recorded on the tape. Meanwhile, the speed signal for the speed of the capstan motor M is fed back to a capstan speed error adjusting section 7 to compensate the speed error of the capstan motor M.

Thus, when the CHP signals are detected from the tape in the normal pattern, a normal servo control routine is carried out by controlling the speed and phase of the capstan motor M in accordance with the CHP signals, thereby making it possible to obtain a normal picture.

However, if the CHP signals are not detected, the regeneration is carried out by controlling the capstan speed, and, under this condition, the E.V. detected from the video signals is compared with the predetermined value X. If the E.V. is larger than the value X, that is, when "E.V.>X", the video signals are regenerated by controlling only the capstan speed even if the CHP signals are not continuously detected.

Under this condition, the fact that the E.V. is larger than the value X means that the video signals are normally regenerated even though the phase cannot be controlled due to the lack of the CHP signals and only the capstan speed is controlled.

When normal video signals are outputted by controlling only the capstan speed, if the CHP signals are detected again, the normal servo control routine is performed.

However, when a tape is regenerated by controlling only the capstan speed without controlling the phase, if the E.V. becomes smaller than the value X, that is, if E.V.<X, then the non-signal phase control routine is performed.

That is, if the E.V. becomes smaller than the value X, it means that the capstan phase has deviated, and that the video signals are not detected in the normal pattern. In this case, therefore, the dummy phase error section 4 is activated to supply a dummy phase error signal to the capstan phase control section 5, while the capstan speed control section 6 supplies the speed and phase controlling signals in the form of PWM (pulse width modulation) signals to the capstan motor M so as to give a certain time delay and to detect E.V. signals.

That is, the non-signal phase control routine L2 is carried out when CHP signals are supplied, and if the E.V. is smaller than the value X. In this routine L2, first, the dummy phase error section 4 is activated so that a dummy phase error signal is outputted, and the outputted dummy phase error signal together with the capstan speed control signal are supplied from the capstan speed control section 6 to the capstan motor M in the form of the PWM signals so that the phase of the capstan motor M should be adjusted by the dummy phase error signal. After carrying out the above step, the video E.V. is detected over a certain period of time and the detected E.V. is compared with the predetermined value Y.

The purpose of detecting the envelope value by giving a delay for a certain period of time after supplying the dummy phase error signal and the speed adjusting signal to the capstan motor M is to detect the E.V. after that the phase of the capstan motor M is adjusted by the dummy phase error signal.

Then, if the detected E.V. is smaller than the predetermined value Y, the non-signal phase control routine L2 is carried out again after modifying the phase of the dummy phase error signal, and then, the detected E.V. is compared with the value Y.

That is, when the phase of the capstan motor M is adjusted by the first dummy phase error signal, if the E.V. is smaller than the value Y, it is decided that the phase is not accurate. Therefore, a second dummy phase error signal is outputted to adjust the phase of the capstan motor M, and then, the E.V. is compared with the predetermined value Y again.

If the E.V. detected in the above described manner is larger than the predetermined value Y, that is, if E.V.>Y, the outputting of the dummy phase error signal is blocked, and then, the capstan motor M is controlled by means of the capstan speed control signal again. That is, if the E.V. is larger than the predetermined value Y, it means that the phase of the capstan motor M has been corrected by the dummy phase error signal. Therefore, the outputting of the dummy phase error signals is stopped, and the capstan motor M is controlled by only the capstan speed control signals.

Under this condition, the dummy phase error section 4 for outputting dummy phase error signals receives the outputs of a head switch pulse detecting section 1 and an F.M. E.V. detecting section 2 in an via a computing section 3 which computes the E.V. of the video signals.

According to the present invention as described above, if the CHP signals are detected from the tape, the usual normal servo control routine is carried out, and if the CHP signals are not detected, the speed of the capstan motor M is controlled by only the capstan speed control signal. Meanwhile, if the detected E.V. is larger than the predetermined value X, it is decided that the phase is correct and the recorded signals are regenerated in the normal manner, and if the E.V. is smaller than the value X, it is decided that the phase of the capstan motor is not accurate because of the non-detection of the signals and the non-signal phase control routine L2 is carried out.

In the non-signal phase control routine L2, first a dummy phase error signal is outputted so that the capstan motor M should be controlled by the speed control signal and the dummy phase error signal. Then the E.V. is detected after elapsing a certain period of time, and, if the E.V. thus detected is found to be smaller than the predetermined value X, it is decided that the phase of the capstan motor M is not accurate, and another dummy phase error signal having a different phase is outputted to repeat the above procedure. Meanwhile, if the detected E.V. is larger than the predetermined value Y, it is decided that the phase of the capstan motor M is accurate, and the outputting of the dummy phase error signal is blocked, thereby making the capstan motor M controlled by the capstan speed control signal.

According to the present invention, therefore, even in the case where no control pulses are recorded on the tape, or where the control pulses recorded on the tape are not readable, a normal picture state can be maintained when regenerating the tape.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A servo control method for controlling speed and phase of a capstan motor, said method comprising:
   comparing a detected envelope value of a video signal with a first value; and
   performing a non-signal phase control routine for adjusting the phase of said capstan motor to achieve a desirable state of said video signal regenerated from a tape by generating dummy phase error signals when said envelope value is smaller than said first value.

2. The servo control method of claim 1, wherein said non-signal phase control routine comprises:
   generating said dummy phase error signals;
   controlling the phase of said capstan motor according to said dummy phase error signals;
   waiting for a time period required for adjusting the phase of said capstan motor in response to said dummy phase error signals;
   detecting said video envelope value after waiting for the passage of said time period;
   comparing said detected envelope value with a second value;
   if said detected envelope value is larger than said second value
   then controlling said capstan motor in response to capstan speed control signals.

3. The servo control method of claim 1, wherein said first value and said second value are obtained through experiments and are designed to be smaller than said envelope value when the video signals provide a proper picture.

4. A servo control method as claimed in claim 1, wherein said non-signal phase control routine comprises:
   disabling control of said phase of said capstan in response to control signals recorded on said tape and thereafter controlling said phase in response to said dummy phase error signals.

5. A servo control method as claimed in claim 4, wherein said non-signal phase control routine further comprises:
   delaying for a predetermined time period before comparing said detected envelope value with a second value; and
   reestablishing control of said phase in response to said control signals if said detected envelope value is greater than said second value.

6. The servo control method of claim 2, wherein said non-signal phase control routine further comprises disabling control of said phase of said capstan in response to control signals recorded on said tape.

7. A servo control method for controlling speed and phase of a capstan motor, said method comprising:
   detecting an envelope value;
   comparing the detected envelope value with a first value;
   if said envelope value is smaller than said first value, performing a non-signal phase control routine for adjusting the phase of said capstan motor to regenerate video signals from a video tape by generating dummy phase error signals; and
   if said envelope value is not smaller than said first value, performing a normal phase control routine for adjusting the phase of said capstan motor in response to capstan speed control signals regenerated from said video tape.

8. The servo control method of claim 7, wherein said non-signal phase control routine comprises successively:
   generating said dummy phase error signals;
   controlling the phase of said capstan motor according to said dummy phase error signals;
   waiting for a time period during adjustment of the phase of said capstan motor in response to said dummy phase error signals and then again detecting said video envelope value;
   comparing said envelope value detecting after said time period with a second value;
   if said detected envelope value is larger than said second value, controlling said capstan motor in response to said capstan speed control signals; and
   if said detected envelope value is smaller than said second value, then controlling said capstan motor in response to said dummy phase error signals.

9. The servo control method of claim 8, wherein said first value and said second value are different values.

10. A capstan speed and phase control device for a video tape recorder, said device comprising:
    capstan motor means for turning a capstan feeding video tape;
    capstan phase controlling pulse detector means for detecting capstan phase controlling pulses on said video tape;
    dummy phase error means for generating dummy phase error signals in response to video signals regenerated from said video tape;
    capstan phase controlling means for generating phase control signals in response to one of said capstan phase controlling pulses and said dummy phase error signals in dependence upon whether said capstan phase controlling pulses are detected in a regular pattern;
    capstan speed error adjusting means for generating speed error signals in response to speed error of said capstan motor means; and
    capstan speed control means for controlling speed and phase of said capstan motor means in response to said speed error signals and said phase control signals.

11. A servo control method for controlling speed and phase of a capstan motor for feeding video tape, said method comprising:
    controlling said phase of said capstan motor in response to control signals recorded on said video tape;
    performing a first detection of an envelope of a video signal reproduced from said video tape;
    comparing said envelope to a first threshold; and
    disabling said control of said phase in response to said control signals and enabling control of said phase in response to dummy phase control signals generated by a computing section, if said envelope is less than said first threshold.

12. A servo control method as claimed in claim 11, further comprising:
    performing a second detection of said envelope;
    comparing said envelope to a second threshold; and
    reestablishing control of said phase in response to said control signals, if said envelope is greater than said second threshold.

* * * * *